(12) United States Patent
Matsushita et al.

(10) Patent No.: US 11,237,774 B2
(45) Date of Patent: Feb. 1, 2022

(54) SYSTEM AND CONTROL METHOD

(71) Applicant: Canon Kabushiki Kaisha, Tokyo (JP)

(72) Inventors: Kazumasa Matsushita, Kanagawa (JP); Masataka Yoshida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/110,492

(22) Filed: Dec. 3, 2020

(65) Prior Publication Data

US 2021/0173596 A1 Jun. 10, 2021

(30) Foreign Application Priority Data

Dec. 5, 2019 (JP) .............................. JP2019-220513

(51) Int. Cl.
*G06F 3/12* (2006.01)
*G06N 20/00* (2019.01)
*G06N 5/04* (2006.01)

(52) U.S. Cl.
CPC .......... *G06F 3/1208* (2013.01); *G06F 3/1219* (2013.01); *G06F 3/1255* (2013.01); *G06F 3/1292* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,048,455 | B1* | 6/2021 | Armstrong | G06F 3/1255 |
| 2020/0193249 | A1* | 6/2020 | Matsuzawa | G06K 15/002 |
| 2020/0285426 | A1* | 9/2020 | Matsuzawa | G06F 3/1253 |
| 2020/0310700 | A1* | 10/2020 | Nishida | G06F 3/1267 |
| 2020/0361210 | A1* | 11/2020 | Sato | B41J 2/16579 |

FOREIGN PATENT DOCUMENTS

JP 2010245875 A 10/2010

* cited by examiner

*Primary Examiner* — Dov Popovici
(74) *Attorney, Agent, or Firm* — Venable LLP

(57) ABSTRACT

According to the present invention, a system is provided which comprises an obtainment unit that obtains print setting information including setting values of a plurality of setting items, an estimation unit that estimates a recommended value of a first setting item included in the print setting information by using a learned model which uses, as input data, at least some pieces of the print setting information obtained by the obtainment unit and outputs, as output data, the recommended value of the first setting item, and a notification unit performs notification in accordance with a difference between the setting value of the first setting item which is indicated in the print setting information obtained by the obtainment unit and the recommended value of the first setting item which is estimated by the estimation unit.

13 Claims, 7 Drawing Sheets

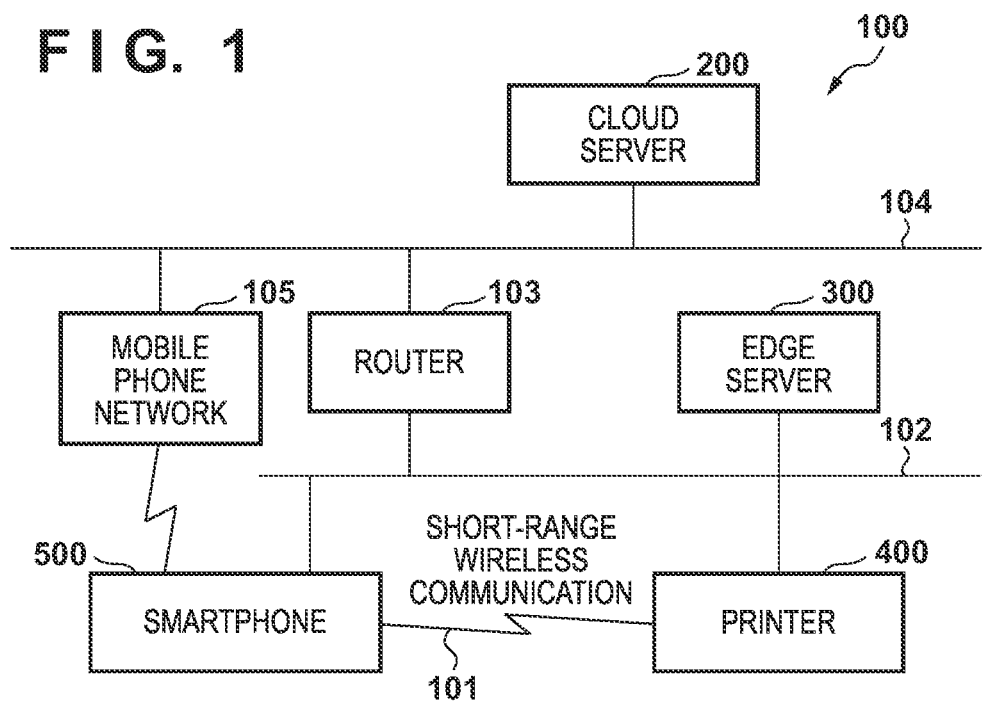
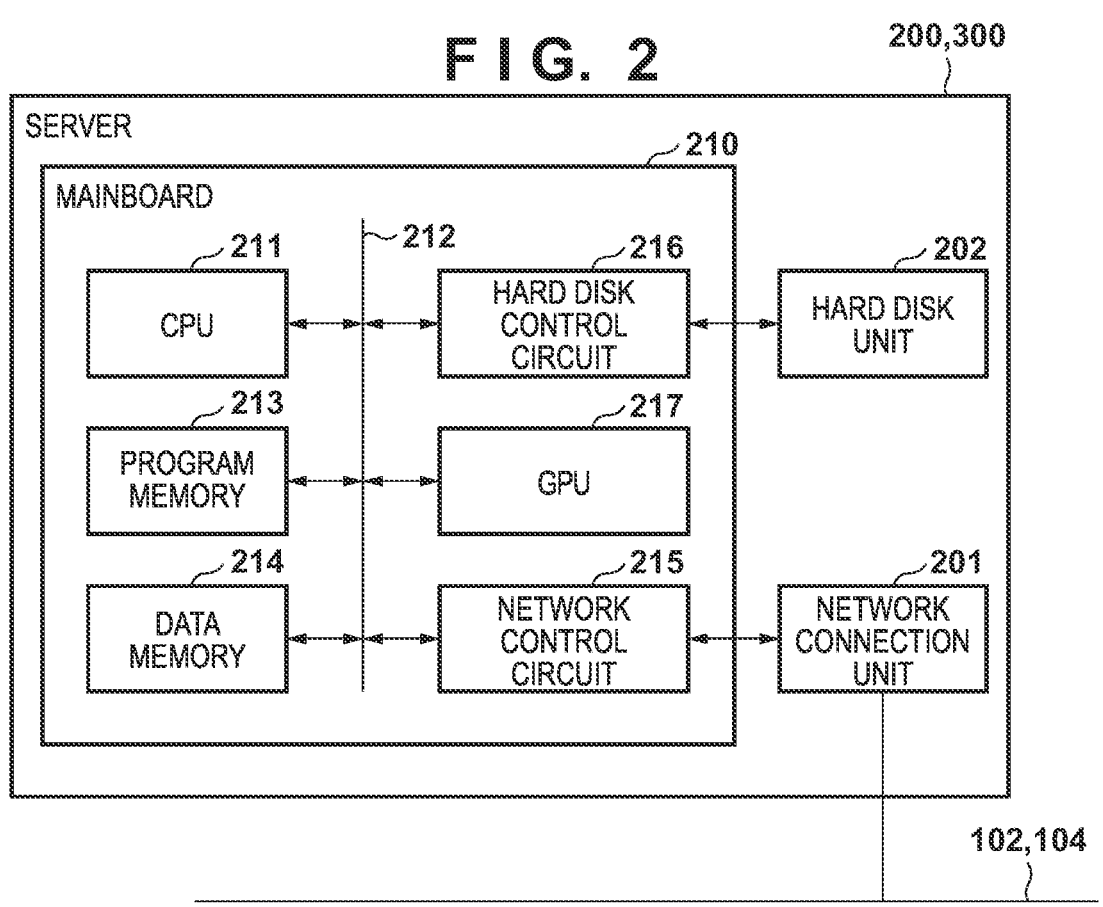

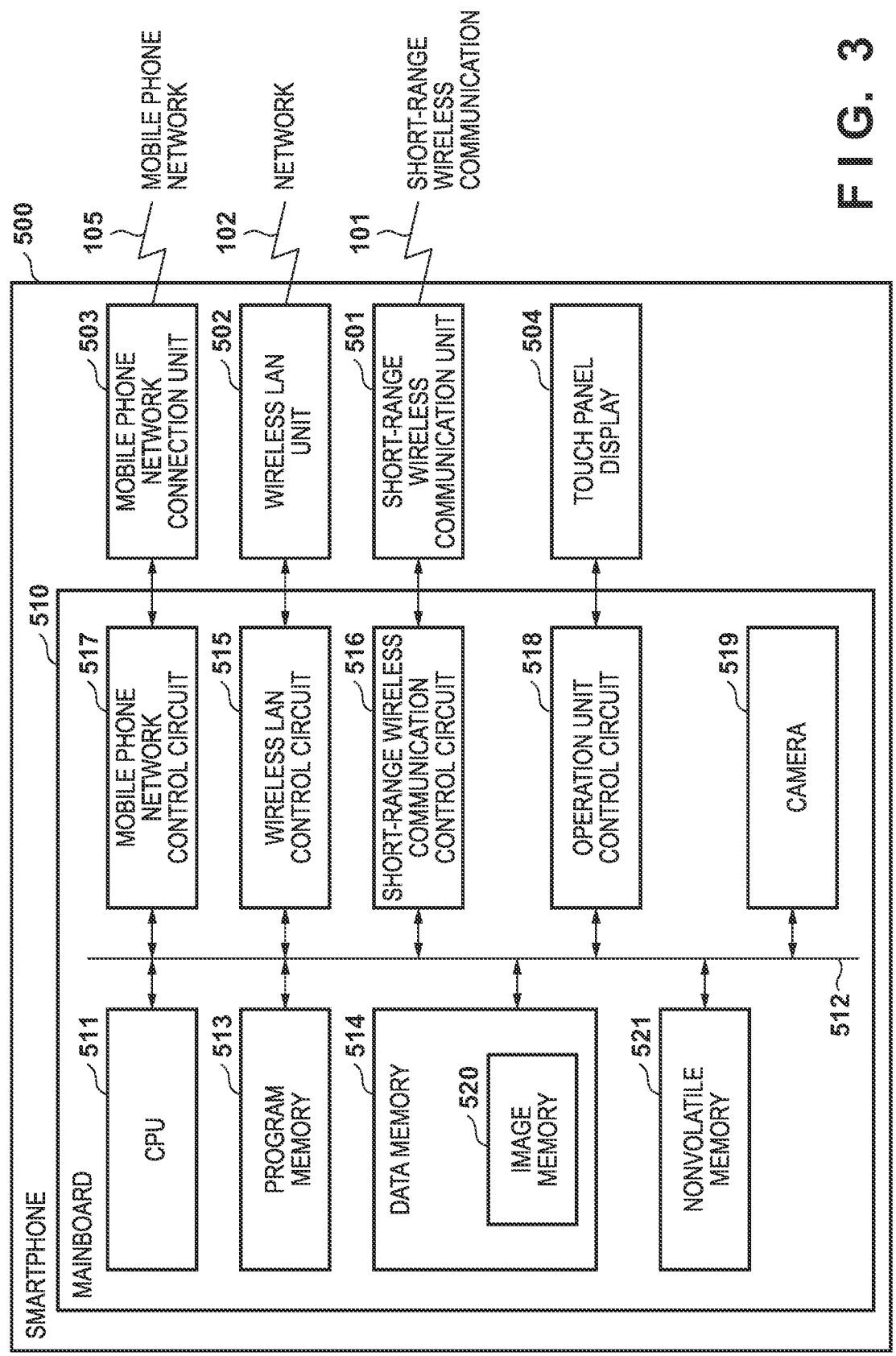

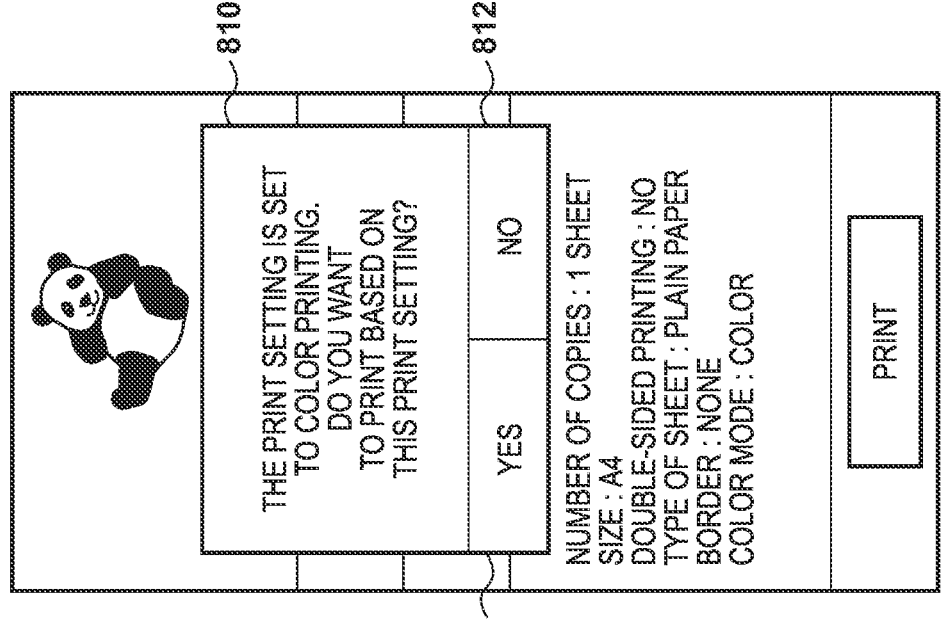
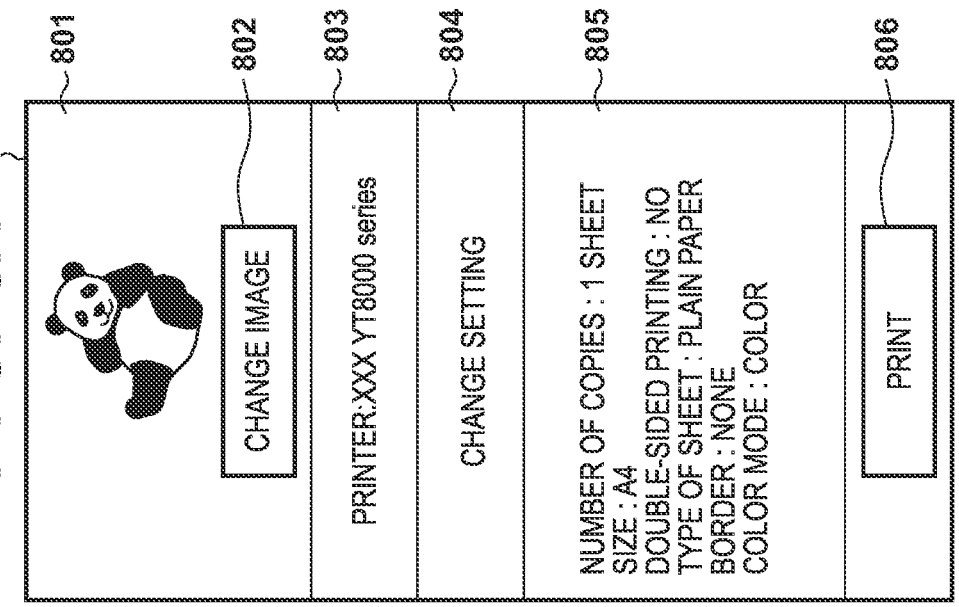

SYSTEM AND CONTROL METHOD

BACKGROUND OF THE INVENTION

Field of the Invention

The present invention relates to a system and a control method thereof.

Description of the Related Art

Conventionally, a print instruction to a printer is issued from an apparatus (an instruction apparatus) such as a touch panel included in the printer, a mobile terminal such as a smartphone, or a PC. Also, as disclosed for example in Japanese Patent Laid-Open No. 2010-245875, an instruction apparatus can display a setting screen related to a print instruction. A printer performs a printing operation based on print settings input on the setting screen.

In a case in which a print instruction is to be issued by using an instruction apparatus, printing as desired by a user may not be performed in some cases. For example, even if the user desires to print two pages per sheet, if the input instruction is an instruction to print one page per sheet, printing will be performed according to the setting to print one page per sheet as a matter of course. Such a situation will also occur if the user has erroneously input an instruction to print one page per sheet even though an instruction to print two pages per sheet should have been input, and such a situation will also occur if the instruction to print one page per sheet is the default setting on the setting screen and the user has forgotten to change this instruction. When printing that is undesirable for the user is performed, printing will need to be performed again. As a result, it leads to wasteful consumption of printing materials (for example, ink and toner) and print media (for example, paper). In addition, it will also wastefully require more printing time.

SUMMARY OF THE INVENTION

The present invention suppresses execution of printing which is not desired by a user.

The present invention includes the following arrangement. That is, an aspect of the present invention provides a system comprising: at least one memory; and at least one processor wherein when executing a program stored in the at least one memory, the processor causes the system to operate as an obtainment unit configured to obtain print setting information including setting values of a plurality of setting items, an estimation unit configured to estimate a recommended value of a first setting item included in the print setting information by using a learned model which uses, as input data, at least some pieces of the print setting information obtained by the obtainment unit and outputs, as output data, the recommended value of the first setting item, and a notification unit configured to perform notification in accordance with a difference between the setting value of the first setting item which is indicated in the print setting information obtained by the obtainment unit and the recommended value of the first setting item which is estimated by the estimation unit.

According to another aspect of the present invention, provided is a system comprising: at least one memory; and at least one processor wherein when executing a program stored in the at least one memory, the processor causes the system to function as an obtainment unit configured to obtain print setting information including setting values of a plurality of setting items, a generation unit configured to generate learning data in which data of a target setting item of the print setting information obtained by the obtainment unit is set as supervised data and data other than the target setting item of the print setting information is set as input data, and a learning unit configured to perform learning to generate a learned model which uses the learning data to output, as output data, a recommended value of the target setting item.

According to still another aspect of the present invention, provided is a control method to be executed by an information processing apparatus, the method comprising: obtaining print setting information including setting values of a plurality of setting items, estimating a recommended value of a first setting item included in the print setting information by using a learned model which uses, as input data, at least some pieces of the print setting information obtained in the obtaining and outputs, as output data, the recommended value of the first setting item, and performing notification in accordance with a difference between the setting value of the first setting item which is indicated in the print setting information obtained in the obtaining and the recommended value of the first setting item which is estimated in the estimating.

According to the present invention, it is possible to suppress execution of printing which is not desired by a user.

Further features of the present invention will become apparent from the following description of exemplary embodiments with reference to the attached drawings.

BRIEF DESCRIPTION OF THE DRAWINGS

FIG. 1 is a block diagram showing an example of the arrangement of a processing system according to the present invention;

FIG. 2 is a block diagram showing the hardware arrangement of each server according to an embodiment of the present invention;

FIG. 3 is a block diagram showing the hardware arrangement of a smartphone according to the embodiment of the present invention;

FIGS. 8A and 8B are views each showing an example of the arrangement of a screen according to the embodiment of the present invention.

DESCRIPTION OF THE EMBODIMENTS

Figure 4:
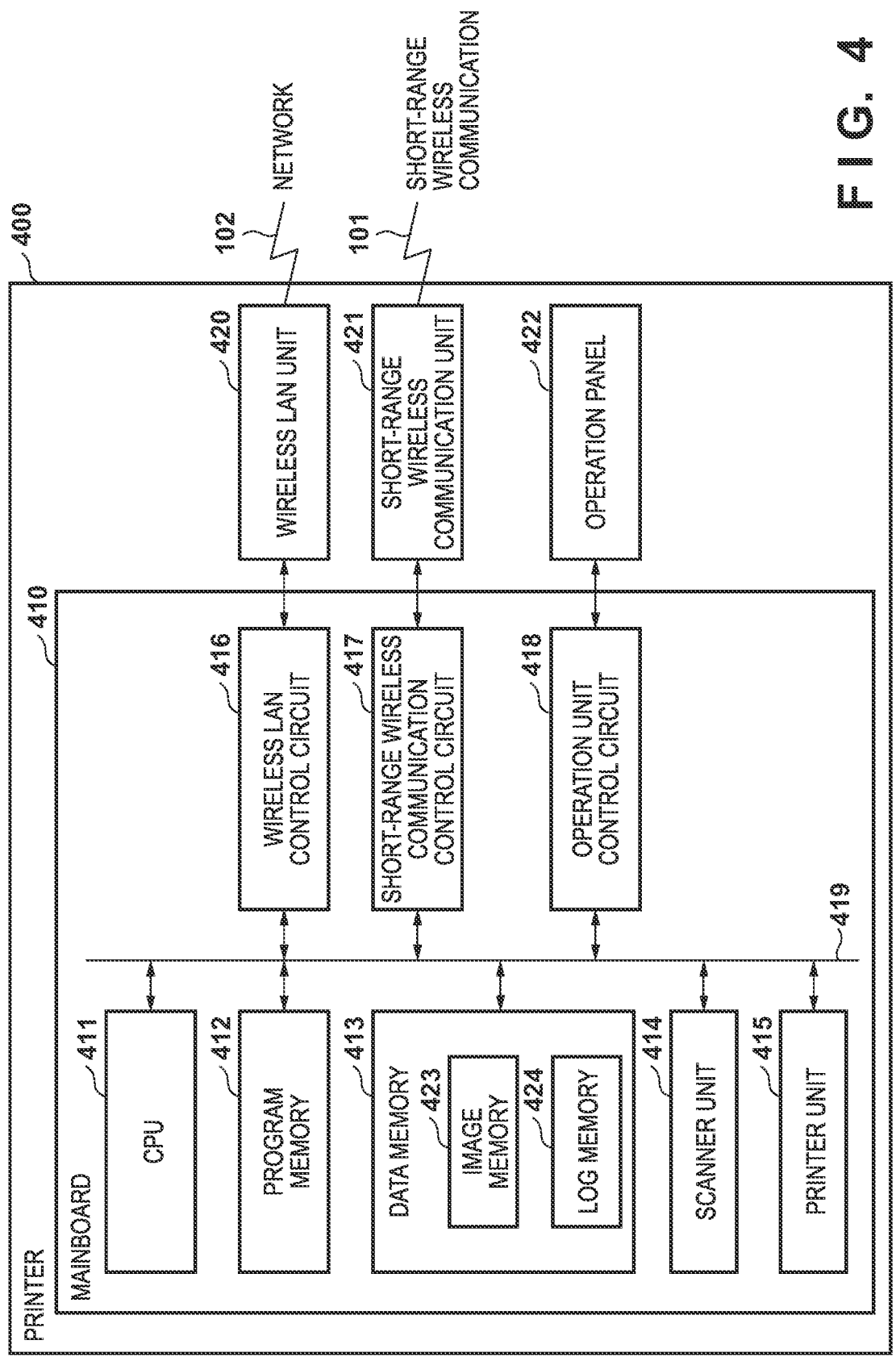
FIG. 4 is a block diagram showing the hardware arrangement of a printer according to the embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be

First Embodiment

The first embodiment of the present invention will be described in detail hereinafter.

[System Arrangement]

FIG. 1 is a block diagram showing an example of the arrangement of a processing system 100 according to this embodiment. The processing system 100 includes a cloud server 200, an edge server 300, a printer 400, and a smartphone 500 which are connected by a local area network (LAN) 102 and the Internet 104. The edge server 300, the printer 400, and the smartphone 500 are connected to each other via the local area network (LAN) 102 and can connect to the Internet 104 via a router 103 installed in the LAN 102.

Although the router 103 is illustrated as a device that connects the LAN 102 and the Internet 104, it can have a wireless LAN access point function that forms the LAN 102. In such a case, it can be arranged so each device can participate in the LAN 102 by not only connecting to the router 103 via a wired LAN, but also by connecting to an access point via a wireless LAN. For example, it can be arranged so that the printer 400 will be connected via the wired LAN and the smartphone 500 will be connected via a wireless LAN. Each of the devices and the edge server 300 can communicate with the cloud server 200 through the Internet 104 connected via the router 103.

The edge server 300 and each of the devices can communicate with each other via the LAN 102. Also, the smartphone 500 and the printer 400 can communicate by short-range wireless communication 101. Wireless communication in compliance with Bluetooth® standards or NFC (Near Field Communication) standards can be used as the short-range wireless communication 101. In addition, the smartphone 500 is also connected to a mobile phone network 105 and can communicate with the cloud server 200 via the mobile phone network 105.

Note that the above-described arrangement is merely an example, and the present invention is not limited to this. For example, although an example in which the router 103 has an access point function has been shown, the access point may be formed by a device different from the router 103. In addition, the connection between each device and the edge server 300 may be executed by using a connection means other than the LAN 102. For example, wireless communication other than the wireless LAN such as an LPWA (Low Power Wide Area), ZigBee, Bluetooth®, short-range wireless communication, or the like, wired connection such as USB, or infrared communication may be used.

Also, although only one printer 400 and one smartphone 500 are illustrated as devices in FIG. 1, a plurality of printers 400 and a plurality of smartphones 500 may be arranged. In this case, it may be arranged so that the edge server 300 will manage the plurality of printers 400. In addition, each of the plurality of smartphones 500 can operate as an instruction apparatus to the printer 400.

[Hardware Arrangement]

(Server Apparatus)

FIG. 2 is a block diagram showing an example of the hardware arrangement of an information processing apparatus that can operate as the cloud server 200 and the edge server 300 according to this embodiment. Assume that the cloud server 200 and the edge server 300 have a common hardware arrangement in this description. The server includes a mainboard 210 which controls the overall apparatus, a network connection unit 201, and a hard disk unit 202. In the mainboard 210, a CPU 211 operates in accordance with the contents of a data memory 214 and control programs stored in a program memory 213 which are connected via an internal bus 212. The CPU 211 controls the network connection unit 201 via a network control circuit 215 to connect to a network such as the Internet 104 and the LAN 102 to communicate with another apparatus. The CPU 211 can execute data read/write from/to the hard disk unit 202 which is connected via a hard disk control circuit 216.

The hard disk unit 202 stores various kinds of data in addition to an operating system (OS) and various kinds of control software which are loaded and used in the program memory 213. A GPU 217 is connected to the mainboard 210 and can execute various kinds of arithmetic processing operations instead of the CPU 211. The GPU 217 can efficiently perform arithmetic operations by preforming as many data processing operations in parallel as possible. Hence, in a case in which machine learning, such as deep learning, is to be performed over a plurality of times by using a learning model, it is effective to perform processing by the GPU 217.

In this embodiment, assume that the processing by a learning module 251 (to be described later) will be performed by using the GPU 217 in addition to the CPU 211. More specifically, in a case in which a learning program including a learning model is to be executed, the CPU 211 and the GPU 217 will execute an arithmetic processing operation in cooperation to perform learning. Note that the processing of the learning module 251 may also be executed by causing only one of the CPU 211 and the GPU 217 to execute an arithmetic processing operation. The estimation module 351 may also use the CPU 211 or the GPU 217 in a manner similar to the learning module 251. In addition, although this embodiment has described that the cloud server 200 and the edge server 300 use a common arrangement, the present invention is not limited to this arrangement. For example, it may be arranged so the GPU 217 will be incorporated in the cloud server 200, but will not be incorporated in the edge server 300. Alternatively, it may be arranged so that each server will use the GPU 217 which has a different performance characteristic.

(Smartphone)

FIG. 3 is a block diagram showing an example of the hardware arrangement of the smartphone 500 according to this embodiment. The smartphone 500 includes a mainboard 510 which controls the overall apparatus, a wireless LAN unit 502, a short-range wireless communication unit 501, a mobile phone network connection unit 503, and a touch panel display 504. In the mainboard 510, a CPU 511 operates in accordance with the contents of a data memory 514 in a RAM format and control programs stored in a program memory 513 which are connected via an internal bus 512. The CPU 511 controls the wireless LAN unit 502 via a wireless LAN control circuit 515 to perform wireless LAN communication with another communication terminal apparatus.

The CPU 511 can control the short-range wireless communication unit 501 via a short-range wireless communication control circuit 516 to detect connection to another short-range wireless communication terminal and to transmit/receive data to/from this other short-range wireless communication terminal. The CPU 511 can also control the mobile phone network connection unit 503 via a mobile phone network control circuit 517 to connect to the mobile phone network 105 and make a call or transmit/receive data. The CPU 511 can also control an operation unit control circuit 518 to execute desired display operations on the touch panel display 504 and accept an operation from a user. The CPU 511 can control a camera unit 519 to capture images and can store each captured image in an image memory 520 in the data memory 514. Also, aside from the captured images, an image which has been obtained from an external apparatus through the mobile phone network, the LAN 102, or the short-range wireless communication 101 can be stored in the image memory 520 or, on the other hand, be transmitted to another external apparatus.

A nonvolatile memory 521 is formed from a flash memory or the like and stores data which needs to be stored even after the power has been turned off. For example, the nonvolatile memory 521 can store, in addition to address book data, various kinds of communication information, and information of devices to which the apparatus has connected in the past, image data to be stored or application software used to implement various kinds of functions in the smartphone 500.

(Printer)

FIG. 4 is a block diagram showing an example of the hardware arrangement of the printer 400 as an image processing apparatus according to this embodiment. The printer 400 includes a mainboard 410 which controls the overall apparatus, a wireless LAN unit 420, a short-range wireless communication unit 421, and an operation panel 422. In the mainboard 410, a CPU 411 operates in accordance with the contents of a data memory 413 in a RAM format and control programs stored in a program memory 412 which are connected via an internal bus 419. The CPU 411 controls a scanner unit 414 to read an original such as a paper sheet or the like and stores the read data in an image memory 423 in the data memory 413. The CPU 411 also controls a printer unit 415 to perform print processing by printing an image stored in the image memory 423 in the data memory 413 on a print medium.

The CPU 411 controls the wireless LAN unit 420 via a wireless LAN communication control circuit 416 to execute wireless LAN communication with another communication terminal apparatus. The CPU 411 also controls the short-range wireless communication unit 421 via a short-range wireless communication control circuit 417 to detect connection to another short-range wireless communication terminal and to transmit/receive data to/from this other short-range wireless communication terminal. The CPU 411 can control an operation unit control circuit 418 to display the state of the printer 400 or display a function selection menu on the operation panel 422 and to accept an operation from the user.

[Software Arrangement]

Figure 5:
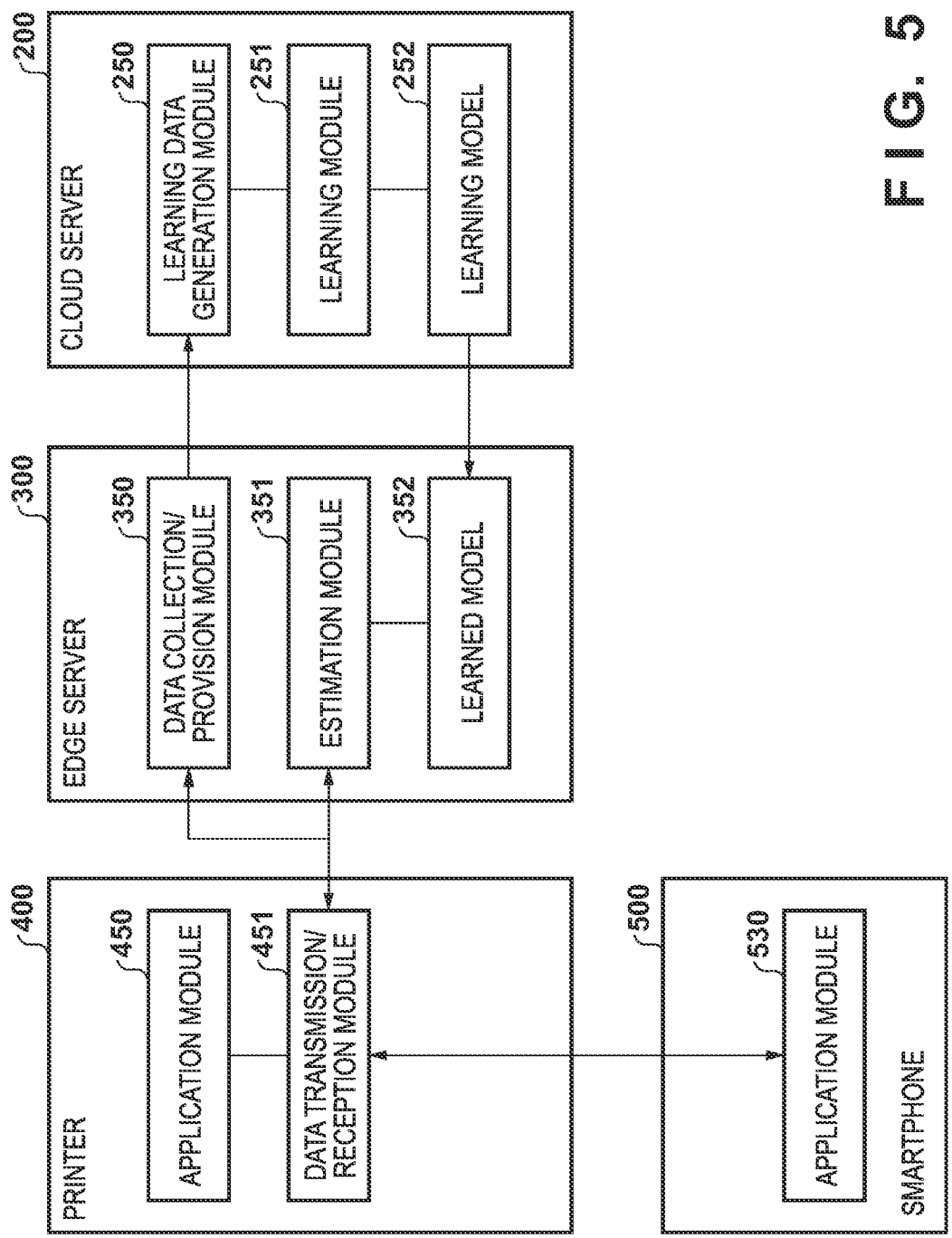
FIG. 5 is a block diagram showing the software arrangement of each apparatus according to the embodiment of the present invention.

FIG. 5 is a block diagram showing an example of the software arrangement of each apparatus forming the processing system 100 according to this embodiment. Only the modules related to learning and estimation according to this embodiment have been illustrated in this software arrangement, and other software modules have been omitted. For example, illustration of an OS and various kinds of middleware that operate in the devices and on the server, an application for maintenance, and the like has been omitted.

The cloud server 200 includes a learning data generation module 250, the learning module 251, and a learning model 252. The learning data generation module 250 is a module that generates, based on data received from an external device, learning data that can be processed by the learning module 251. The learning data is a set of input data X of the learning module 251 and supervised data T which indicates the correct answer of the learning result. The learning module 251 is a program module that executes learning with respect to the learning model 252 based on the learning data received from the learning data generation module 250. The learning model 252 accumulates the result of the learning performed by the learning module 251. An example in which the learning model 252 is implemented as a neural network will be described here. Classification of input data and determination of evaluation values can be performed by optimizing the weighting parameters between the nodes of a neural network. The learning model 252 that has been accumulated as a result of learning is delivered as a learned model to the edge server 300 and is used in the estimation processing executed in the edge server 300.

The edge server 300 includes a data collection/provision module 350, an estimation module 351, and a learned model 352. The data collection/provision module 350 is a module that can transmit data received from an external apparatus (for example, the printer 400) and data collected by the edge server 300 itself as a dataset to be used for learning to the cloud server 200. The estimation module 351 is a program module that uses the learned model 352 to execute estimation based on the data transmitted from the printer 400 and returns the obtained result to the printer 400. The data transmitted from the printer 400 is data usable as the input data X of the estimation module 351. The learned model 352 is used in the estimation performed in the edge server 300. Assume that the learned model 352 will be implemented as a neural network in a manner similar to the learning model 252. The learned model 352 stores the learning model 252 accumulated in and delivered from the cloud server 200. The learned model 352 may deliver the entire learning model 252 or may extract, from the learning model 252, only a part necessary for estimation in the edge server 300 and deliver the extracted part.

The printer 400 includes an application module 450 and a data transmission/reception module 451. The application module 450 is a module that implements various kinds of functions to be executed in the printer 400, and is a module that uses a learning/estimation mechanism by machine learning. The data transmission/reception module 451 is a module that requests the edge server 300 to perform learning or estimation. During learning, the data transmission/reception module 451 transmits data to be used for learning to the data collection/provision module 350 of the edge server 300 according to a request from the application module 450. Also, during estimation, the data transmission/reception module 451 transmits data to be used for estimation to the edge server 300 according to a request from the application module 450 and returns the received estimation result to the application module 450.

The smartphone 500 includes an application module 530. The application module 530 is an application to use each function provided by the printer 400. For example, the application module 530 provides a print setting screen and transmits a print instruction (print job) to the printer 400 when printing is to be performed by using the printer 400.

Note that although this embodiment shows a mode in which the result of learning processing by the cloud server 200 is used for estimation by distributing the result as the learned model 352 to the edge server 300, the present invention is not limited to this mode. The arrangement as to which of the cloud server 200, the edge server 300, and the printer 400 is to execute learning or estimation can be determined in accordance with the distribution of hardware resources, the calculation amount, and the magnitude of the data communication amount. Alternatively, it may be arranged so that the apparatus which is to execute learning or estimation will be dynamically changed in accordance with the distribution of these resources, the calculation amount, and the increase and the decrease in the data communication amount. In a case in which learning and estimation are to be performed by different subjects, it can be arranged so that the subject on the estimation side will be able to execute estimation more quickly by using a logic which can be used only for estimation or reducing the capacity of the learned model 352.

[Learning Model]

Figure 6A:
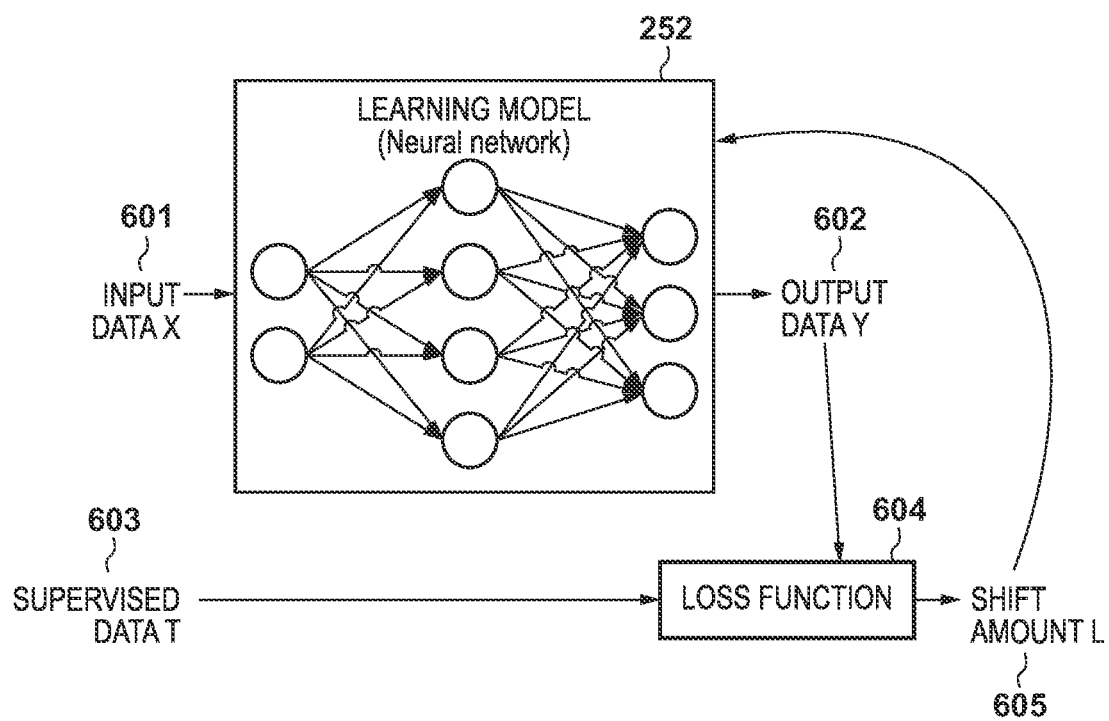
FIG. 6A is a schematic view showing the input/output structure of a learning model according to the embodiment of the present invention.
Figure 6B:
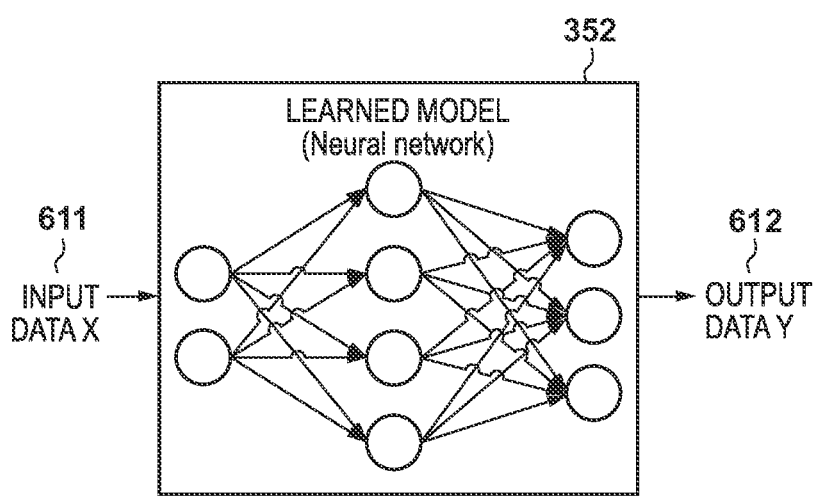
FIG. 6B is the input/output structure of a learned model according to the embodiment of the present invention.

FIGS. 6A and 6B are schematic views for explaining the input/output structure when the learning model 252 and the learned model 352, respectively, are to be used. Each of the learning model 252 and the learned model 352 according to this embodiment is arranged as a neural network and includes an input layer, a hidden layer, and an output layer.

FIG. 6A shows the relationship between the learning model 252 and the input/output data during learning. Input data X 601 is data input to the input layer of the learning model 252. The input data X according to this embodiment will be described in detail later. Since supervised data T 603 is provided as the correct answer data of the estimation result of the input data X 601 during learning, a shift amount L 605 is obtained from the correct answer of the estimation result by providing output data Y 602 and the supervised data T 603 to a loss function 604. A combine-weight coefficient or the like between the nodes of each neural network in the learning model 252 is updated so that the shift amount L 605 will be minimized with respect to each of the multiple learning data sets. An error backpropagation method is a method in which the combine-weight coefficient or the like between the nodes of each neural network is adjusted so that the above-described shift amount will be minimized. The output data Y 602 is output as a result estimated by using the learning model 252 as a learning model. In this embodiment, the learning model performs parameter estimation of setting items of the print setting. Hence, the probability of each setting value of the print setting is estimated based on various kinds of information input as the input data X 601. More specific examples of algorithms for machine learning are the nearest neighbor algorithm, the Naive Bayes algorithm, a decision tree, a support vector machine, and the like. Deep learning in which the feature amount and the combine-weight coefficient for learning are self-generated by using a neural network can also be raised as another example of a machine learning algorithm. The learning method and the algorithm are not particularly limited, and an algorithm that can be used among the above-described algorithms can be appropriately applied to this embodiment.

FIG. 6B shows the relationship between the learned model 352 and the input/output data during learning. Input data X 611 is the data input to the input layer of the learned model 352. The input data X according to this embodiment will be described in detail later. Output data Y 612 is output as a result estimated based on the input data X 611 by using the learned model 352 as a machine learning model. This output data Y 612 is used as the estimation result during estimation. Note that although it has been described that the learned model 352 during estimation includes a neural network equal to that of the learning model 252 during learning, a model obtained by extracting only a part necessary for estimation may be prepared as the learned model 352. This can reduce the data amount of the learned model 352 and reduce the neural network processing time during estimation.

[Data Arrangement]

Data to be used in this embodiment will be described. In the processing system 100 according to this embodiment, the edge server 300 collects the print settings used during printing from the connected printer 400. The print setting items and their respective setting values collected here can include various kinds of items and values in accordance with the function of the printer 400. In addition, the time information and the information of the image data set as the print target when printing was performed are also collected together. Information indicating as to whether the print instruction was issued via the operation panel 422 of the printer 400 or the print instruction was issued via an external instruction apparatus (for example, the smartphone 500) may also be included. The learning data generation module 250 of the cloud server 200 generates learning data to be used in the learning processing from the data collected by the edge server 300.

The learning model 252 according to this embodiment uses, as the learning data, each print setting item and its setting value, the type (data format) of the image data, and the like. The learning model 252 also outputs, as the output data Y 602, the setting value of a target setting item. More specifically, for example, assume that a setting item "color mode" is set as the target setting item among the pieces of information provided from the printer 400. In this case, the setting value set in the setting item "color mode" is used as the supervised data T 603, and corresponding data which is obtained by using data other than this target setting item as the input data X 601 will be generated as the learning data. Subsequently, learning will be repeatedly performed by using this learning data. Hence, plurality of learning data targeting each of the plurality of setting items can be generated from one piece of print setting information provided from the printer 400.

On the other hand, during estimation, the setting value of the target setting item will be estimated by inputting, to the learned model 352 obtained as the learning result, the print setting item and its setting value, the type (data format) of the image data, and the like as the input data X 611. At this time, a separate learned model may be used for each target setting item.

[Overall Operation]

Figure 7A:
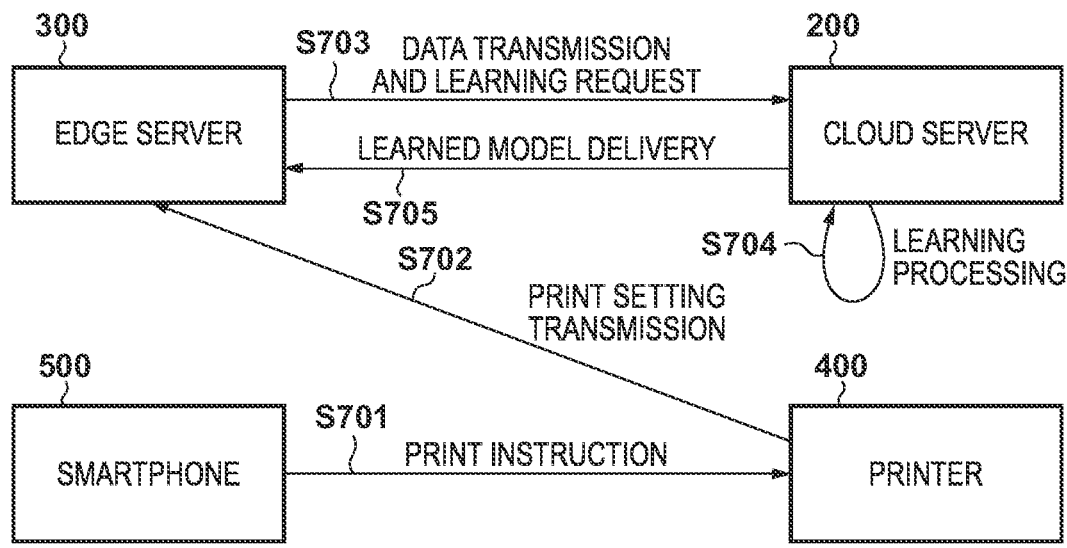
FIGS. 7A and 7B are views for explaining the sequence of processing according to the embodiment of the present invention.
Figure 7B:
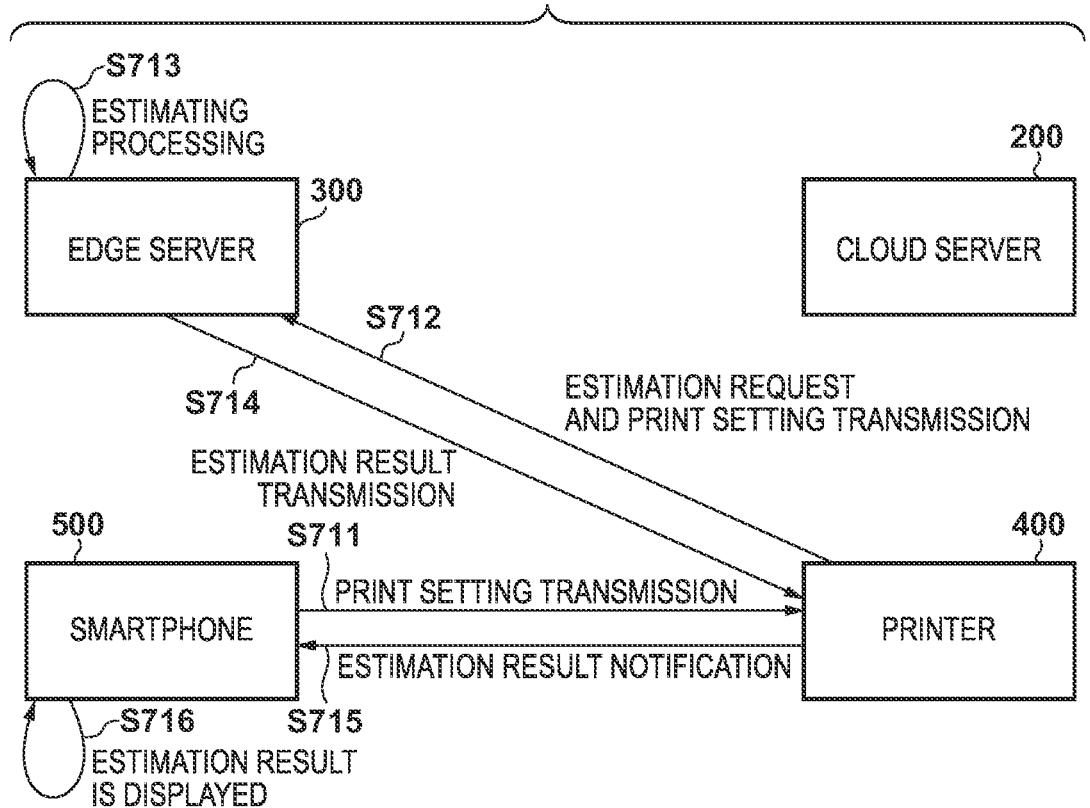

FIGS. 7A and 7B are views for explaining the overall movement of the processing system 100 according to this embodiment. Although a case in which a print instruction is issued from the smartphone 500 will be described as an example here, assume that similar processing is also performed in a case in which a print instruction is issued from an operation screen (not shown) displayed on the operation panel 422 of the printer 400 or another instruction apparatus. Also, although a learning phase and an estimation phase will be described separately below, these processing operations may be executed separately or in parallel.

(Learning Phase)

FIG. 7A shows the overall movement of the processing system 100 during learning. The processing of each apparatus is implemented by the CPU or the GPU of each apparatus reading out a program stored in the storage unit and executing the program.

In S701, the smartphone 500 accepts print settings via the application module 530 and transmits a print instruction to the printer 400. The print instruction in this case includes pieces of information such as the print settings, the image data to be the print target, and the like.

In S702, the printer 400 transmits, to the edge server 300, various kinds of information included in the print instruction accepted from the smartphone 500. The transmission timing in this case may be the point of time at which the printing operation of the printer 400 has been completed or may be before the completion of the printing operation. If the printing operation has been completed, this printing result may also be transmitted to the edge server 300.

In S703, the edge server 300 transmits, together with the learning request, the various kinds of information received from the printer 400 to the cloud server 200. The transmission timing in this case may be set at the timing at which a predetermined amount of data has been accumulated, or the transmission may be performed periodically.

In S704, the cloud server 200 generates the learning data by using the various kinds of data received from the edge server 300. As described above, learning data is generated based on the pair of the input data X 601 and the supervised data T 603. In addition, the learning data may be generated for each target setting item. Subsequently, the cloud server 200 updates the learning model 252 by performing learning processing by using the generated learning data.

In S705, the cloud server 200 delivers, to the edge server 300, the learned model 352 obtained as a result of the learning processing. As described above, the learned model 352 delivered here may be the entire learning model 252 or may be generated from a part of the learning model 252. Also, a plurality of the learned models 352 may be generated. The edge server 300 performs the subsequent estimation processing by using the delivered learned model 352.

Note that a case in which a learning request is transmitted from the printer 400 to the cloud server 200 via the edge server 300 when the learning request is made has been described here. However, the present invention is not limited to this. For example, it may be arranged so that the learning request will be directly transmitted from the printer 400 to the cloud server 200. Also, although it has been described that the learned model 352 will be delivered to the edge server 300 each time learning is to be performed in the cloud server 200, the learned model 352 need not be delivered each time if the cloud server 200 is to perform a large amount of learning. For example, the learned model 352 may be delivered periodically or a delivery request may be issued from the edge server 300 as needed and the learned model 352 may be delivered as a response to this request.

The learning phase will be described by using a more specific example. FIG. 8A shows a print setting screen 800 which is displayed on the touch panel display 504 of the smartphone 500. A preview screen 801 for previewing image data selected as a print target is displayed on the print setting screen 800. The print setting screen can shift to a screen (not shown) for changing the print target when a button 802 is pressed. Information of a printer which is to perform the printing is displayed in an area 803, and it is arranged so that selecting the area 803 will allow another printer to be selected. Also, the print setting screen can shift to a screen (not shown) for changing the print setting when an area 804 is selected. Information of the print settings selected at this point of time is displayed in an area 805. A print instruction is transmitted to the printer 400 when a button 806 is pressed. In this case, the following print setting has been made for an image file set as the print target in the print setting screen 800.

Printer: XXX YT8000 series
Number of Copies: 1
Sheet Size: A4
Double-Sided Printing: No
Type of Sheet: Plain Paper
Border: None
Color Mode: Color If such a print instruction is issued to the printer 400, this information is provided from the printer 400 to the cloud server 200 via the edge server 300. Assume that the print setting information here includes the above-described various kinds of information used in the learning processing, and user information, print-target information, print setting items and their respective setting values, and the like are included in this case.

(Estimation Phase)

FIG. 7B shows the movement of the overall processing system 100 during estimation. The processing of each apparatus is implemented by the CPU or the GPU of each apparatus reading out a program stored in the storage unit and executing the program.

In S711, the smartphone 500 accepts print settings via the application module 530. The smartphone 500 transmits the accepted print settings to the printer 400. Assume that a print instruction has not been issued at this point of time. In this case, assume that the print settings include information equivalent to those of the print instruction transmitted in S701 in the estimation phase.

In S712, the printer 400 transmits, to the edge server 300, an estimation request together with the print settings received from the smartphone 500.

In S713, the edge server 300 generates the input data X 611 of the learned model 352 based on the estimation request received from the printer 400. Subsequently, the edge server 300 inputs the generated input data X 611 to the learned model 352 and obtains the output data Y 612 which is to be the estimation result. The estimation processing can be performed for each target setting item in this case.

In S714, the edge server 300 transmits the estimation result to the printer 400. At this time, the estimated value (recommended value) can also be transmitted together to each setting item whose current setting value is different from the estimated setting value.

In S715, the printer 400 transmits a notification to the smartphone 500 based on the estimation result received from the edge server 300. In this embodiment, if the current setting value is different from the estimated setting value, control will be performed to cause the smartphone 500 to display a confirmation screen to confirm this setting value.

In S716, the smartphone 500 displays the estimation result based on the notification received from the printer 400. In this embodiment, if the current setting value is different from the estimated setting value, a confirmation screen to confirm this setting value will be displayed. Otherwise, the confirmation screen will not be displayed.

The estimation phase will be described by using a more specific example. As shown in FIG. 8A, assume that the following settings have been input on the touch panel display 504 of the smartphone 500.

Printer: XXX YT8000 series
Number of Copies: 1
Sheet Size: A4
Double-Sided Printing: No
Type of Sheet: Plain Paper
Border: None
Color Mode: Color When such settings have been selected, an estimation request is transmitted together with the setting information from the printer 400 to the edge server 300. Assume that, as a result of estimation processing by the edge server 300, a setting value "monochrome" of the setting item "color mode" has been estimated as a recommended value. In this case, the confirmation screen 810 shown in FIG. 8B is displayed by the smartphone 500.

A confirmation message 811 is displayed on a confirmation screen 810 together with the information of the setting value which is different from the recommended value as described above. In the above-described example, a message "The print setting is set to color printing. Do you want to print based on this print setting?" is displayed as the confirmation message 811. A print instruction based on the set print settings is transmitted to the printer 400 when a button 812 is pressed. The screen will shift to a screen (not shown) for changing the print settings to accept changes to the settings when a button 813 is pressed.

As described above, according to this embodiment, it is possible to suppress execution of printing which is not desired by the user.

Note that although the print setting transmission timing in S711 is set at the timing at which the print settings have been accepted in the example of FIG. 7B, the present invention is not limited to this. For example, it may be set at the timing at which the user has pressed the button 806 after designating the print settings. In this case, the printer 400 can switch between performing estimation processing before the printing operation and executing printing based on the estimation result or displaying the confirmation screen 810 on the smartphone 500.

Also, although FIG. 8B shows an example in which a confirmation message is displayed for only one setting item, it may be arranged so that a confirmation message will be displayed for a plurality of setting items.

In addition, although the confirmation screen 810 is displayed by being overlaid on the print setting screen 800 in the example of FIG. 8B, the present invention is not limited to this. For example, a confirmation screen may be displayed by shifting the screen. Alternatively, points that require confirmation may be emphasized by blinking or changing the color of each target print setting item and setting value.

Although only a message prompting the confirmation of the setting item is displayed in the above-described example, the present invention is not limited to this. For example, it may be arranged so that the recommended value will be displayed together with this message. In this case, the user may be notified of the recommended setting value on the confirmation screen 810. For example, in the above-described example, the contents of the recommendation may be displayed together with the reason by displaying a message which says, "Printing is set to be executed by color printing, but this setting will increase the ink consumption when other print settings are taken into account. Therefore, monochrome printing is recommended. Do you still want to execute color printing according to the current print settings?".

In addition, in the above-described example, the confirmation screen 810 is displayed based on the estimation result. However, the present invention is not limited to this arrangement, and another method may be employed. For example, it may be arranged so that the value of the setting item will be automatically switched to the estimated recommended value based on the estimation result. More specifically, assume that a setting value "monochrome" is obtained as the recommended value of the estimation result in a case in which the setting value "color" has been set with respect to the setting item "color mode". In such a case, the setting value "monochrome" is automatically set with respect to the setting item "color mode". In this case, a message indicating this change may be displayed on the screen or the changed setting item may be emphasized and displayed. As a result, the contents obtained from the learning can be automatically reflected on the print settings, and user convenience can be improved. Note that whether the confirmation screen 810 is to be displayed or the setting value is to be changed automatically based on the estimation result can be set by the user in advance.

In addition, the printer 400 transmits (S702 of FIG. 7A) the print settings to the edge server 300 in the learning phase in the above-described embodiment. At this time, the printer 400 may also transmit status information of the execution of the corresponding print job. Status information in this case can be statuses such as "normal completion", "suspension", "abnormal completion", and the like. In particular, the print settings may be incorrect when printing is suspended based on user instruction. Furthermore, if printing is subsequently performed again after the settings have been changed, it can be assumed that the changed print settings are more suitable as print settings. Hence, in a case in which a print instruction is issued again when the print settings have been changed after the printing has been suspended by a user instruction, information of this change can be included as learning data. For example, it may be arranged so that the print setting information based on the setting values before the change will be removed from the learning data when the operation has been suspended and the setting values have been changed. By performing learning by taking into account such pieces of information, the accuracy of the estimation result can be further improved.

In the above-described embodiment, learning was performed after the cloud server 200 had collected data from the edge server 300 and the printer 400 which are connected to the network. In this case, learning is performed based on the usage tendencies of many users who use the printer 400, and a general-purpose learned model that can support many users is generated as a result. In contrast, it may be arranged so that a learned model that has been adapted to a specific user will be generated. In this case, for example, identification information for uniquely identifying the user may be included as the learning data. As a result, an estimation result corresponding to the user can be obtained. Note that the identification information here may be input by the user or information associated with an instruction apparatus such as the smartphone 500 or the like may be used. The cloud server 200 need not be used in such an arrangement. Hence, for example, it may be arranged so that the edge server 300 will perform learning by using data collected in an arrangement limited to the LAN 102 and will generate a learned model suited to a user who is to use this limited network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-220513, filed Dec. 5, 2019 which is hereby incorporated by reference herein in its entirety.

What is claimed is:

1. A system comprising:
at least one memory; and
at least one processor
wherein when executing a program stored in the at least one memory, the processor causes the system to operate as
an obtainment unit configured to obtain print setting information including setting values of a plurality of setting items,
an estimation unit configured to estimate a recommended value of a first setting item included in the print setting information by using a learned model which uses, as input data, at least some pieces of the print setting information obtained by the obtainment unit and outputs, as output data, the recommended value of the first setting item, and
a notification unit configured to perform notification in accordance with a difference between the setting value of the first setting item which is indicated in the print setting information obtained by the obtainment unit and the recommended value of the first setting item which is estimated by the estimation unit.

2. The system according to claim 1, wherein the notification unit performs notification to prompt confirmation of the first setting item in a case in which there is a difference between the setting value of the first setting item which is indicated in the print setting information obtained by the obtainment unit and the recommended value of the first setting item which is estimated by the estimation unit.

3. The system according to claim 1, wherein the notification unit performs notification of the recommended value in a case in which there is a difference between the setting value of the first setting item which is indicated in the print setting information obtained by the obtainment unit and the recommended value of the first setting item which is estimated by the estimation unit.

4. The system according to claim 1, wherein the notification unit performs notification upon changing the value of the first setting item to the recommended value in a case in which there is a difference between the setting value of the first setting item which is indicated in the print setting information obtained by the obtainment unit and the recommended value of the first setting item which is estimated by the estimation unit.

5. The system according to claim 1, wherein the print setting information is input via an instruction apparatus different from a printer which is to execute printing, and
the notification unit performs notification to the instruction apparatus.

6. A system comprising:
at least one memory; and
at least one processor
wherein when executing a program stored in the at least one memory, the processor causes the system to function as
an obtainment unit configured to obtain print setting information including setting values of a plurality of setting items,
a generation unit configured to generate learning data in which data of a target setting item of the print setting information obtained by the obtainment unit is set as supervised data and data other than the target setting item of the print setting information is set as input data, and
a learning unit configured to perform learning to generate a learned model which uses the learning data to output, as output data, a recommended value of the target setting item.

7. The system according to claim 6, wherein the print setting information includes identification information for identifying a user, and
the generation unit includes the identification information in the input data of the learning data.

8. The system according to claim 6, wherein the print setting information includes status information which indicates whether a corresponding print processing operation has been suspended by a user instruction, and
the generation unit generates the learning data based on the status information.

9. A control method to be executed by an information processing apparatus, the method comprising:
obtaining print setting information including setting values of a plurality of setting items,
estimating a recommended value of a first setting item included in the print setting information by using a learned model which uses, as input data, at least some pieces of the print setting information obtained in the obtaining and outputs, as output data, the recommended value of the first setting item, and
performing notification in accordance with a difference between the setting value of the first setting item which is indicated in the print setting information obtained in the obtaining and the recommended value of the first setting item which is estimated in the estimating.

10. The method according to claim 9, wherein the performing the notification includes performing notification to prompt confirmation of the first setting item in a case in which there is a difference between the setting value of the first setting item which is indicated in the print setting information obtained in the obtaining and the recommended value of the first setting item which is estimated in the estimating.

11. The method according to claim 9, wherein the performing the notification includes performing notification of the recommended value in a case in which there is a difference between the setting value of the first setting item which is indicated in the print setting information obtained in the obtaining and the recommended value of the first setting item which is estimated in the estimating.

12. The method according to claim 9, wherein the performing the notification includes performing notification upon changing the value of the first setting item to the recommended value in a case in which there is a difference between the setting value of the first setting item which is indicated in the print setting information obtained in the obtaining and the recommended value of the first setting item which is estimated in the estimating.

13. The method according to claim 9, wherein the print setting information is input via an instruction apparatus different from a printer which is to execute printing, and
the notification in the performing the notification is performed to the instruction apparatus.

\* \* \* \* \*